US009369570B1

(12) United States Patent
Kolodizner et al.

(10) Patent No.: US 9,369,570 B1
(45) Date of Patent: Jun. 14, 2016

(54) CONCURRENT RECORDINGS OF TELEPHONIC INTERACTIONS

(71) Applicant: NICE-SYSTEMS LTD, Ra'anana (IL)

(72) Inventors: Efim Kolodizner, Ashdod (IL); Shay Levy, Ra'anana (IL); Tal Zur, Rishon-Lezion (IL); Roni Krivoshey, Ramat Hasharon (IL); Kobi Shem Tov, Ra'anana (IL)

(73) Assignee: NICE-SYSTEMS LTD, Ra'anana (IL)

( * ) Notice: Subject to any disclaimer, the term of this patent is extended or adjusted under 35 U.S.C. 154(b) by 0 days.

(21) Appl. No.: 14/714,374

(22) Filed: May 18, 2015

(51) Int. Cl.
*H04M 1/24* (2006.01)
*H04M 3/08* (2006.01)
*H04M 3/22* (2006.01)
*H04M 3/42* (2006.01)
*H04M 1/656* (2006.01)

(52) U.S. Cl.
CPC .............. *H04M 3/2236* (2013.01); *H04M 1/24* (2013.01); *H04M 1/656* (2013.01); *H04M 3/42221* (2013.01)

(58) Field of Classification Search
CPC ............ H04L 65/1066; H04L 65/1083; H04L 67/1002; H04M 3/42374; H04M 7/0057; H04M 3/42221; H04M 3/51; H04M 3/2281; H04M 7/006; H04N 21/4135; H04N 21/43615; H04N 21/4516; H04N 21/454; H04N 21/462; H03Q 2213/13106; H03Q 2213/13103
USPC ........... 379/1.01, 1.02, 9.04, 32.01, 133, 134, 379/266.1; 386/263, 285, 286, 291, 296, 386/299
See application file for complete search history.

(56) References Cited

U.S. PATENT DOCUMENTS

| 5,490,204 | A | * | 2/1996 | Gulledge | H04W 24/00 455/423 |
|---|---|---|---|---|---|
| 6,795,534 | B2 | * | 9/2004 | Noguchi | H04M 7/006 370/252 |
| 8,019,063 | B2 | * | 9/2011 | Gallant | H04M 3/42374 379/112.01 |
| 8,699,700 | B2 | * | 4/2014 | Williams | H04M 3/42221 379/112.01 |
| 2007/0041545 | A1 | * | 2/2007 | Gainsboro | H04M 3/2281 379/188 |
| 2007/0258434 | A1 | * | 11/2007 | Williams | H04M 3/42221 370/352 |
| 2008/0205857 | A1 | * | 8/2008 | Kikkawa | H04N 5/775 386/247 |
| 2014/0341360 | A1 | * | 11/2014 | Williams | H04M 3/42221 379/85 |
| 2015/0279424 | A1 | * | 10/2015 | Marck | G11B 27/036 386/285 |

* cited by examiner

*Primary Examiner* — Binh Tieu
(74) *Attorney, Agent, or Firm* — Soroker-Agmon

(57) ABSTRACT

A method comprising that in response to a beginning of a telephonic interaction in a local telephony system concurrently activating recordations of the telephonic interaction in a plurality of recorders operative parallelly and independently to obtain a plurality of recordings of the interaction corresponding to the plurality of recorders, and further in response to an ending of the telephonic interaction in the local telephony system concurrently terminating the recordations of the telephonic interaction in the plurality of the recorders, thereby providing the plurality of recordings of the interaction corresponding to the plurality of recorders, and subsequently selecting at least one recording among the plurality of the recordings of the interaction based on acquired data related to the quality of recordings associated the recordations, and an apparatus for performing the same.

11 Claims, 3 Drawing Sheets

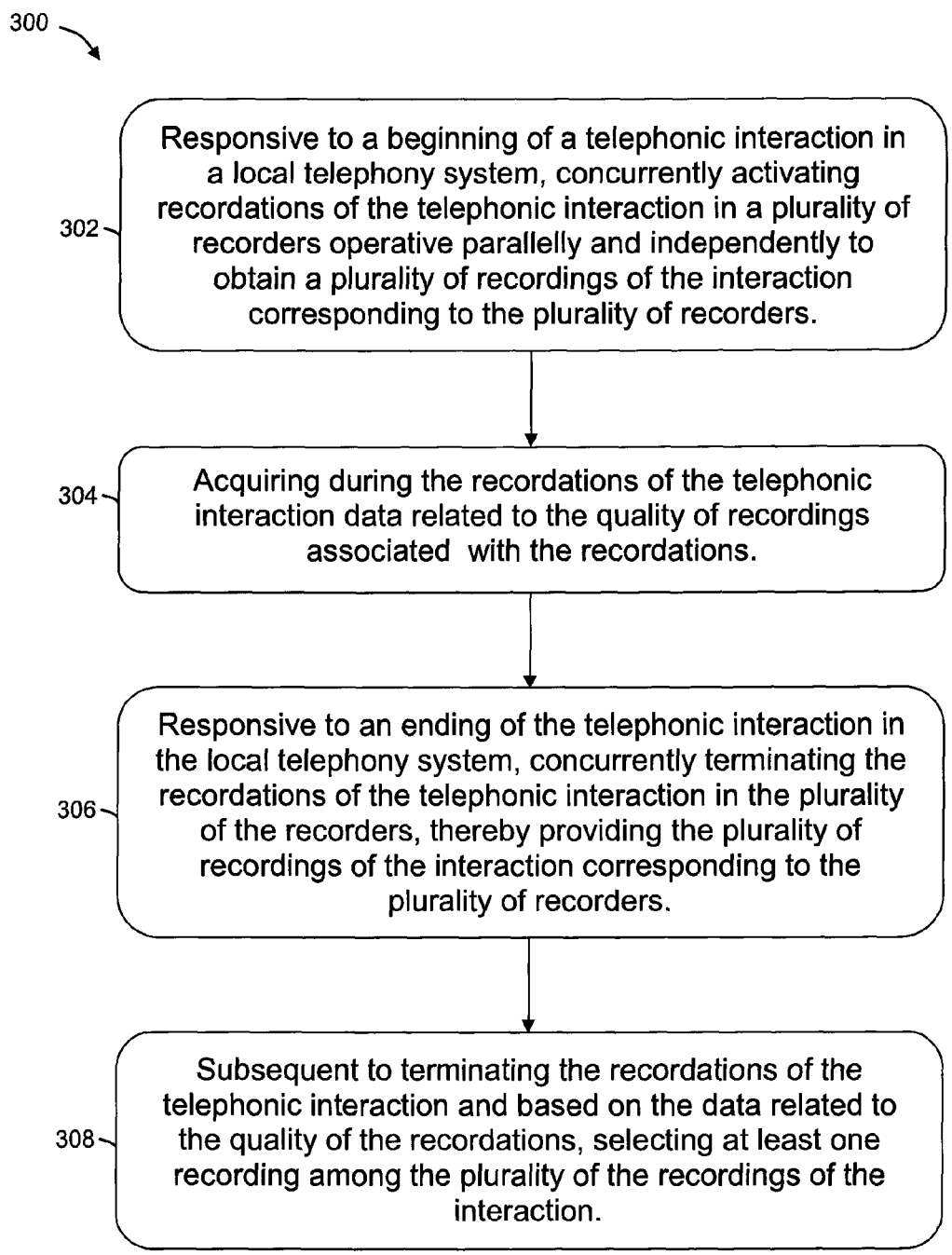

CONCURRENT RECORDINGS OF TELEPHONIC INTERACTIONS

BACKGROUND

The present disclosure generally relates to recording of telephonic interactions, and more specifically to redundant recording of telephonic interactions.

Attempts for fault-tolerant or fail-safe recording of telephonic calls are known in the art. For example, U.S. Pat. No. 5,974,114 which reports that a first server in an active mode replicates call data to a second server in standby mode. The first server is monitored for a fault condition by the second server, as well as other network devices. If a fault condition is detected, the first the first server is switched to standby mode and the second server to active mode. Another example is US application 2014/0270118 which reports fault-tolerant recordings based on concurrently receiving metadata of calls by a plurality of computerized apparatuses, generating unique identifiers for each of the calls such that the unique identifiers are common between the plurality of the computerized apparatuses, activating a first computerized apparatus to control recordings of the calls and assigning the recording with the unique identifiers respective to the calls. Further, operating the computerized apparatuses to receive feedbacks of activities of the recordings, where the feedbacks comprise the assigned unique identifiers and in case of a failure of the first computerized apparatus, activating a second computerized apparatus to maintain the recordings that were controlled by the first computerized apparatus.

SUMMARY

One exemplary embodiment of the disclosed subject matter is a method comprising that in response to a beginning of a telephonic interaction in a local telephony system concurrently activating recordations of the telephonic interaction in a plurality of recorders operative parallelly and independently to obtain a plurality of recordings of the interaction corresponding to the plurality of recorders, and further in response to an ending of the telephonic interaction in the local telephony system concurrently terminating the recordations of the telephonic interaction in the plurality of the recorders, thereby providing the plurality of recordings of the interaction corresponding to the plurality of recorders, and subsequently selecting at least one recording among the plurality of the recordings of the interaction based on acquired data related to the quality of recordings associated the recordations.

Another exemplary embodiment of the disclosed subject matter is a an apparatus for recording a telephonic interaction, comprising a plurality of recorders operative parallelly and independently therebetween, a local telephony system configured to communicate streaming media of the telephonic interaction to the plurality of recorders, and a controlling device configured for controlling in accordance with the local telephony system operations of the plurality of recorders to correspondingly provide a plurality of recordings of the telephonic interaction.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
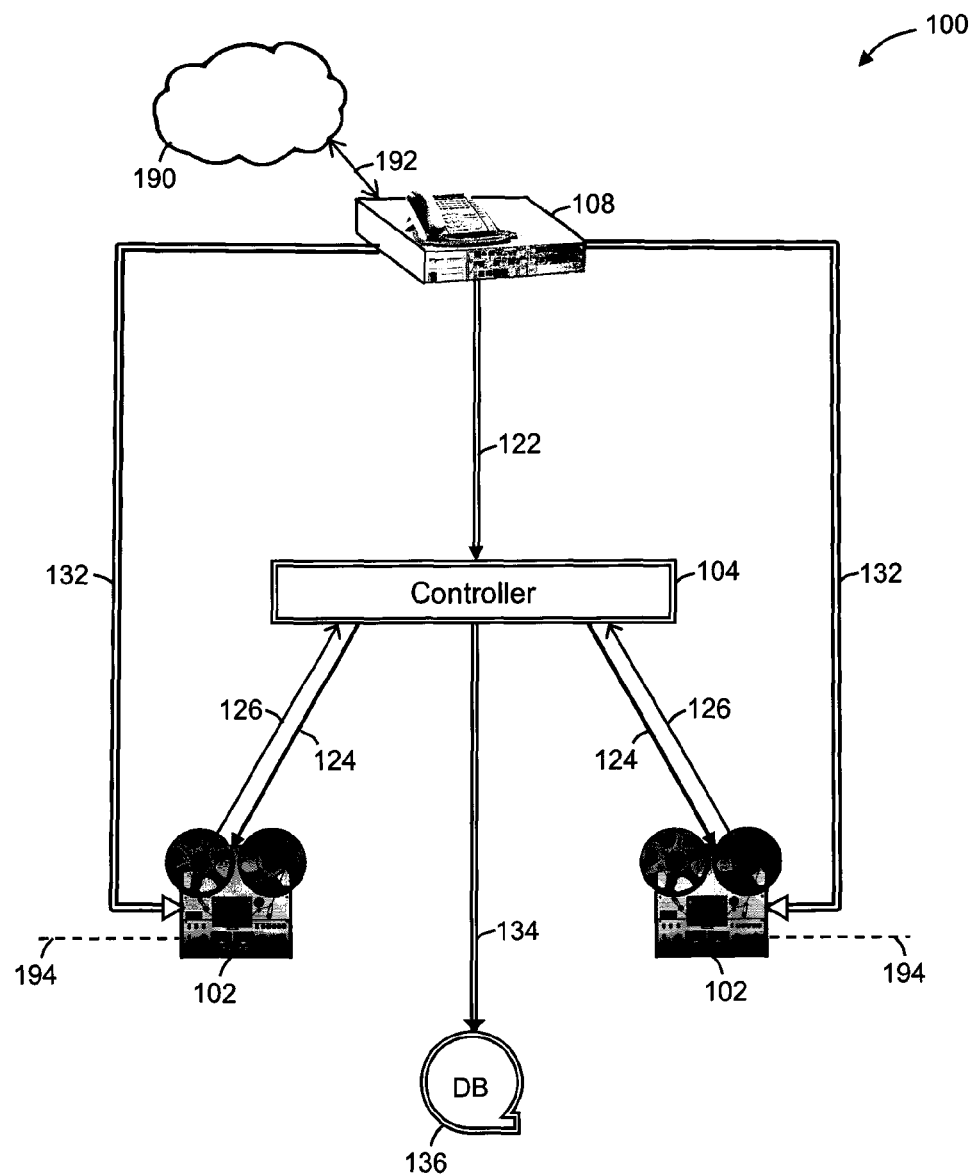

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
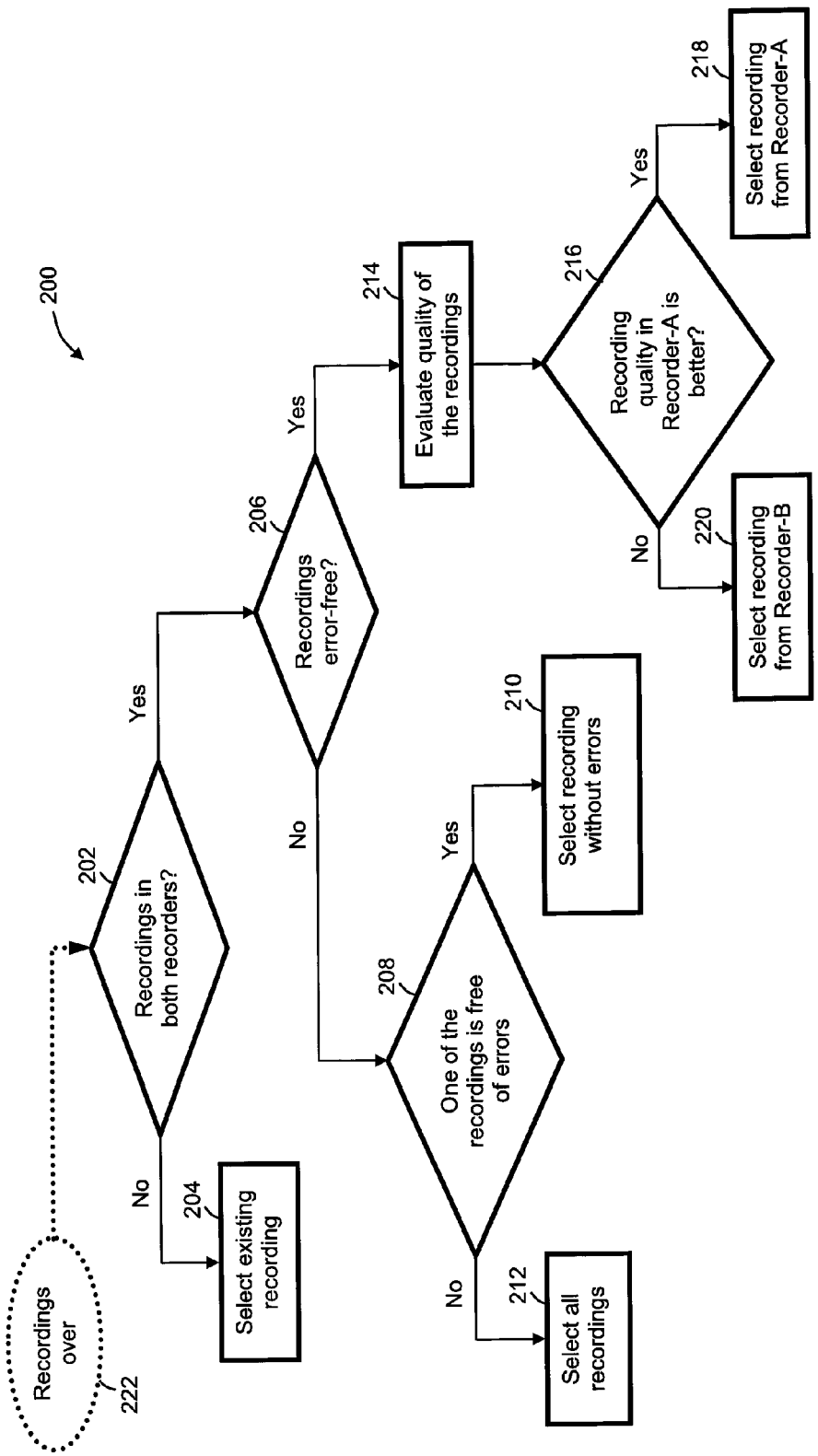

FIG. 1 schematically and figuratively illustrates a system for parallel recording of telephonic interactions, according to exemplary embodiments of the disclosed subject matter;

FIG. 2 outlines in a flowchart operations for selection of recordings, according to exemplary embodiments of the disclosed subject matter; and FIG. 3 outlines operations for selection a recording among parallelly recorded recordings, according to exemplary embodiments of the disclosed subject matter.

DETAILED DESCRIPTION

In the context of the present disclosure, without limiting, term 'telephonic' relates to data transfers between two or more devices. The data may be of any form, such as voice, image or video or any other medium, transferable over any type or combination of communication facilities, such as PSTN (Public Switched Telephone Network), computer networks, Internet communications such as VoIP (Voice over IP), or wireless communications such as WiFi or cellular communications.

For brevity and unless otherwise specified or evident from the context, a telephonic call is referred to also as a call.

In the context of the present disclosure, without limiting, the terms 'audio' and/or 'media' denote and/or relate to contents of a telephonic call such as voice or fax or video, in any form such as an analog signal or a digitally encoded signal or a combination thereof.

In the context of the present disclosure, without limiting, the term 'telephonic interaction' denotes the transfer and/or exchange of contents of a telephonic call and/or of calls ensuing therefrom in any form such as an analog signal or a digitally encoded stream or any combination thereof. The contents may comprise various media separate of combined, such as voice or fax or video or textual data. For brevity, the term 'interaction' implies a telephonic interaction, unless otherwise specified and/or clearly evident from the context.

In the context of the present disclosure, a 'recorder' implies an apparatus for recording, that is, storing on a storage device, contents of telephonic interactions such as audio signals, optionally after conversion to a suitable form. The storage device may be part of the recorder or linked to the recorder such as in a server. Generally, in the context of the present disclosure, the recorder receives the media contents in a digital format of or akin to VoIP, and stores the media contents on a storage device, possibly after some preprocessing such as decryption and/or decompressing. Further generally, in the context of the present disclosure, the recorder is configured to handle numerous cooccurring interactions.

For compact and lucid exposition of the present disclosure, the term 'recording' may refer to different related concepts according to the context of or in which the term appears; namely, 'recording' may refer to an operation of storing streaming media of an interaction such as by a recorder, or 'recording' may refer to stored data of an interaction. Likewise, the term 'recordation' refers to the action or process of recording.

Accordingly, a recording recorded on a recorder is referred to as having a one to one correspondence and/or association with the recorder, and vice versa, and likewise for a recording and a recordation thereof.

In the context the present disclosure, without limiting, the term 'PBX' (Private Branch Exchange) denotes any instrument or apparatus that provides a telephonic access and switching and/or routing.

In the context of the present disclosure the term CTI apparatus (Computer Telephony Integration apparatus) is as known in the art, for example products of Avaya (Avaya Inc.), Cisco (Cisco Systems, Inc.), Alcatel (ALCATEL-LUCENT S.A.) or Genesys (Genesys Telecommunications Laboratories). Yet, without limiting, a CTI apparatus denotes any data processing device, such as a computer, having hardware components for communicating and/or intercommunicating with a PBX. The communication and/or intercommunication generally comprise operations such as call answering, call forwarding or a conference call, as well as acquiring metadata of a call. A CTI apparatus is also referred to as CTI server, and for brevity, a CTI apparatus is also referred to as 'CTI'.

In some embodiments, the CTI apparatus supplies metadata in a particular format and/or by a particular protocol, likely of possibly different from another CTI apparatus. In some embodiments, according to the apparatuses used the CTI transfers also audio and/or other contents to and/or from the PBX.

In the context of the present disclosure the terms 'local telephony' or 'local telephony system' denote a telephony system and/or instrumentation of a particular site or an organization, such as of a business. A local telephony generally and without limiting comprises a PBX, a CTI and/or any other relevant components constructed and configured in a suitable manner for receiving calls and delivering media.

As used herein, the term 'parallel' or 'concurrent' with respect to operations implies one or more operations operative in a practically and/or sufficient concurrent coincidental manner, yet not necessarily strictly simultaneously.

The terms cited above denote also inflections and conjugates thereof.

Organizations and businesses such as call centers generally handle lots of simultaneous telephones telephone calls from various locations. Generally the calls are recorded, and considering the sheer number of the calls, the variety of origins and distances of the calls or the quality of equipment used for conveying the calls, the reliability of the recordings may vary or may degrade such as due to electric static noise, transmission quality variations, communications malfunctions or faulty storage devices.

One technical problem dealt by the disclosed subject matter is increasing or enhancing the reliability of recordings of telephonic interactions over a network.

Another technical problem dealt by the disclosed subject matter is increasing or enhancing the reliability of recording of telephonic interactions over a network in a straightforward and extendible manner.

A technical solution according to the disclosed subject matter is concurrently operating a plurality of recorders, separately and independently of each other, to parallelly record the same streaming media of a telephonic interaction from a local telephony. Thus, the solution is resilient to malfunctioning of a recorder as the other recorders continue to operate and record the interaction independently and irrespectively of the faulty recorder.

In order to decide which recording among the plurality of recordings of an interaction to preserve, data about the recordings and/or process thereof in each recorder are collected or acquired such as by the recorders. The data about the recordings and/or process thereof, referred to also as quality-metadata, comprise elements or parameters such as recording duration, number of communication packets lost or disordered, number of packets with distorted data, or errors of the networking or storage devices. Further, optionally the quality-metadata may comprise elements of communication QoS (Quality of Service) as and/or akin to the art. In some embodiments, the elements and/or parameters of the quality-metadata are assigned weights that, for example, reflect the importance or significance of some errors and/or incidents relative to other errors or incidents.

Thus, when the interaction ends, such as by a termination of a corresponding call, the quality-metadata of the recordings are evaluated and the recording are scored as to the quality thereof. The recording of highest score among recordings evaluated to have sufficiently high score is preserved such as by archiving in a database; otherwise, a plurality of top-scoring recordings among recordings evaluated to have insufficient score are preserved thereby representing a recording of the interaction. It is emphasized that for a given call and/or interaction having a plurality of recorded recordings, only one recording is preserved, provided that the recording has been evaluated to be of sufficient or acceptable quality.

Generally, in some embodiments at least, the plurality of recorders are centrally managed or directed by a suitably constructed and configured apparatus or device, denoted also a recording controller or, for brevity, a controller.

For example, the controller interfaces with the local telephony and responsive to an event indicative of a call the controller concurrently initiates the plurality of recorders to parallelly record the call's interactions, along with providing data for distinguishing the call and/or interaction among other cooccurring calls and interactions. As another example, in response to an event indicative of a call's termination, the quality-metadata of the recorders are acquired by the controller which, consequently, scores and selects recording and, at least optionally, stores the selected recordings.

The scheme portrayed above allows for flexibility and scalability. The number of recorders may be increased and/or varied, such as to further or effectively enhance the recording reliability in view of present and/or expected communications load and characteristics of the calls, the scalability entailing practically a minor or an insignificant penalty of accommodating the controller and the local telephony for the different number of recorders. Further, the process of evaluation and scoring of the quality of the recordings may be varied or enhanced for efficient and satisfactorily performance in determining and selecting recordings.

A potential technical effect of the disclosed subject matter is a simple, flexible and expandable recording system for telephonic interactions that can tolerate faulty recorders with practically no effect on the rest of the system.

A general non-limiting presentation of practicing the present disclosure is given below, outlining exemplary practice of embodiments of the present disclosure and providing a constructive basis for variant and/or alternative embodiments, some of which are subsequently described.

FIG. 1 schematically and figuratively illustrates a system 100 for parallel recording of telephonic interactions, according to exemplary embodiments of the disclosed subject matter.

System 100 comprises a local telephony system, denoted also as a local telephony 108, that generally comprises a PBX, a CTI and/or any other appropriate component for receiving calls and delivering telephonic media.

Local telephony 108 is linked, as indicated by a double-arrow 192, with an external telephonic communications infrastructure, denoted also as communications infrastructure 190, that comprises facilities such as PSTN and/or VoIP and/or Internet and/or cellular and/or WiFi and/or any adequate communications facility.

System 100 further comprises a plurality of recorders, figuratively illustrated as two instances of a recorder 102 that represent any multiple number of recorder 102, as indicated by dashed lines 194.

Each recorder 102 is linked with local telephony 108 by a data link corresponding to each of recorder 102, denoted also as a link 132, through which media of interactions of calls in and/or through local telephony 108 are delivered to each recorder 102.

System 100 further comprises an apparatus or a device as a controller constructed and/or configured to control the operation of each recorder 102, denoted also as a controller 104.

Controller 104 is linked with local telephony 108 by a signaling link, denoted also as a signal channel 122, by which information of and/or about calls in local telephony 108 is provided to controller 104. For example, the information may be events and/or messages of starting and termination of calls, switching or routing of calls and/or any relevant information on occurrences and proceedings of calls in local telephony 108 such as progress of calls. Optionally or alternatively, instead or in addition to local telephony 108 providing information to controller 104 via signal channel 122, controller 104 may proactively acquire information from local telephony 108 via signal channel 122.

Controller 104 is further linked with each recorder 102 by a control link corresponding to each recorder 102, denoted also as control line 124, that provides to each recorder 102 control data such as commands and/or signals for controlling the operation of each recorder 102.

Similarly, controller 104 is further linked with each recorder 102 by a data line corresponding to each recorder 102, denoted also as feedback line 126, that provides controller 104 with information obtained and/or maintained for recordings in each recorder 102, such as of events or incidents that occurred during the recordings as in the quality-metadata that is further described. Optionally or alternatively, instead or in addition to each recorder 102 providing information to controller 104 via feedback line 126, controller 104 may proactively acquire information from each recorder 102 via feedback line 126.

By way of example at least and unless otherwise specified, the calls in local telephony 108 are formed and handled according to VoIP and protocols thereof as known in the art.

Accordingly, by way of example at least, media is provided from local telephony 108 to each recorder 102 via each of link 132 by a suitable protocol such as RTP (Real-time Transport Protocol) and optionally with other protocols such as SIP (Session Initiation Protocol) or RTCP (RTP Control Protocol).

Each recorder 102 is constructed and/or configured to record and store streaming media data via a corresponding link 132. Each recorder 102 is further configured to acquire and maintain, at least temporarily, data related to and/or associated with the recorded calls or interactions, such as for identification the interactions or calls and time related information.

Further, each recorder 102 is constructed and/or configured to acquire and maintain for each interaction data about recording of the interaction and/or of the course of action of the recording, the data collectively referred to also as quality-metadata with respect to the recording of the interaction. The quality-metadata may include indications and/or quantifications of occurrences or faults such as erroneous transmission determined by error-detecting codes, packet loss, packet disordering, equipment malfunction such as storage buffer overrun and/or any QoS-related elements.

Responsive to information of and/or about occurrences and activities of calls in local telephony 108 provided to and/or acquired by controller 104 via signal channel 122, controller 104 concurrently and parallelly controls each recorder 102 via each control line 124 corresponding to each recorder 102.

For example, responsive to initiation and/or beginning of a call and/or of an interaction thereof, an event and/or message is generated in local telephony 108 such as via a CTI component thereof. The event and/or message is sent to controller 104 which, responsively, concurrently activates recording of the call's interaction by each recorder 102, optionally together with related and/or associated data thereof. Further, for example, responsive to termination of a call and/or of an interaction thereof, an event and/or message is generated in local telephony 108 such as via a CTI component thereof. The event and/or message is sent to controller 104 which, responsively, concurrently terminates recording of the call's interaction in and/or by each recorder 102.

When recordings of an interaction are stopped in each recorder 102 by controller 104 pursuant to termination of the respective call in local telephony 108, there is a plurality of recordings in the storage of the plurality of recorders.

Principally at least, all the recordings of the interaction are supposed to be identical since the same interaction is distributed to the plurality of equal recorders, as indicated by the corresponding plurality of instances of link 132. In practice, however, the recordings may deviate or differ from each other due to possible or potential faults or impediments in the course of the recordings of the interaction by different instances of recorder 102 and/or characteristics of instances of link 132.

In order to resolve or select which recording to preserve as a most reliable recording, or at least as an adequately reliable recording, responsive to termination of the recordings controller 104 obtains via feedback line 126 corresponding to each recorder 102 the quality-metadata respective to each recording and further evaluates and/or analyzes the quality-metadata to determine the appropriate recording for selection. In some cases or embodiments, no recordings is suitably distinguished as appropriate then a plurality of recordings are determined to represent one recording. Exemplary determination of recordings by the quality-metadata thereof are provided further below.

In some embodiments, under the control of controller 104 the selected appropriate recording is transferred from the storage of the respective recorder 102 to an archive, denoted schematically also as a database 136.

It is emphasized that the description and operation of system 100 apply, in a duplicative manner, to more than two recorders, such as three or four or more recorders. Thus the reliability of recordings is enhanced and the likelihood of faulty recordings is reduced and/or practically eliminated, at least relative to using one recorder.

Further, the arrangement of more than one parallelly operative recorders can tolerate even a total failure of one recorder and/or of links thereof, as the rest of the recorders continue to operate regardless and transparently to the failure. Likewise, an arrangement of more than two parallelly operative recorders can tolerate even a total failure of two recorders and links thereof, and so forth.

Consequently, the arrangement of more than one parallelly operative recorders as or akin to system 100 is simply and independently repetitive and scalable while avoiding complicated mechanisms therebetween, thus rendering the arrangement robust and stable and fault tolerant relative to using less recorders such as one recorder.

In some embodiments, recordings of interactions by a recorder such as recorder 102 are stored in the recorder. Optionally or alternatively, the recordings are stored in a storage device linked to the recorder. In some embodiments, auxiliary data such as data related to and/or associated with the recordings or interactions are stored inside the recorders while the recordings per se are stored in a separate storage device such as in a server. For brevity, the storage accessible to a recorder is collectively referred to also as the storage the recorder. Thus, any illustrated instance of recorder 102 stands for or represents also the storage the respective recorder.

Storing or archiving of recordings may be carried out in various manners. For example, controller 104 acquires the appropriate recording from the respective recorder 102 via a corresponding feedback line 126, and forwards the recording via a link to database 136, denoted also as database channel 134. Alternatively, for example, controller 104 sends via a corresponding control line 124 a command to the respective recorder 102 to the effect that the respective recorder 102 provides the appropriate recording to controller 104 which subsequently sends the recording via database channel 134 to database 136. Optionally, other mechanism are used, for example, controller 104 sends via a corresponding control line 124 a command to the respective recorder 102 thereby directing the respective recorder 102 to dump or transfer the appropriate recording to database 136 via database channel 134, such as from a partition in a storage device of a server respective to the appropriate recording.

In case a plurality of recordings are determined to represent one recording, then the description above with respect to one recording is applicable, mutatis mutandis, to the plurality of recordings.

The plurality of instances of recorder 102 are constructed and/or configured to operate in an identical and/or equivalent and/or similar manner or functionality, and for brevity are also referred to as equal recorders.

The connections and/or links between elements of system 100 may be of any suitable type, such as wired and/or wireless and/or network connections. For example, control line 124 and/or feedback line 126 may be wireless connections, and the instances of link 132 may be part of a network so that local telephony 108 and each recorder 102 operate on a local network. Additionally, any link and/or connection may comprise and/or operate via multiple links. For example, link 132 may comprise multiple links so that media of interactions are transferred in parallel and/or sequentially over multiple 'threads'.

In some embodiments, connections and/or links of system 100 may have a plurality of functions and/or merged functions. For example, control line 124 and feedback line 126 may be merged for both control to a recorder and feedback from a recorder, or any of control line 124 and/or feedback line 126 may have additional functions.

In some embodiments, the quality-metadata of recordings are acquired by the corresponding recorders that record an interaction during the course of recordations thereof. Optionally or alternatively, the quality-metadata may be otherwise obtained. For example, the quality-metadata is acquired for and/or on behalf of the recorders by the local telephony system such by a suitable component and the quality-metadata is subsequently provided to controller 104 by signal channel 122.

In some embodiments, controller 104 comprises a plurality of independent parallelly operative controllers of equivalent functionality such as of controller 104. Thus, assuming for example two parallelly operative controllers, in case of a failure of one controller the reset of the controllers continue to operate regardless of the faulty controller, thereby further increasing the recordings reliability. The same rationale applied for cases of three or more parallelly operative controllers that can tolerate failure in two or more controllers.

FIG. 2 outlines in a flowchart 200 operations for selection of recordings, according to exemplary embodiments of the disclosed subject matter.

For simplicity and by way of example, without yielding generality, two recorders are assumed in flowchart 200. The recorders are as, for example, recorder 102 of system 100, and are also denoted as Recorder-A and Recorder-B.

The operations of flowchart 200 begin responsive or subsequent to termination of recording by Recorder-A and Recorder-B, as indicated by a dotted balloon 222.

In operation 202 it is checked whether there are recordings in both of the recorders. If false, then in operation 204 the only remaining or present recording is selected.

Otherwise, in operation 206 it is checked whether the recordings are free of errors. In some embodiments, only significant errors are considered, whereas trivial or insignificant errors are disregarded. Optionally, a significant error is one that caused loss and/or distortion of data. Optionally or alternatively, a significant error is one that caused cumulative loss of data above a certain preset and/or determined threshold. Yet optionally or alternatively, a significant error is one that caused cumulative loss of data relative to remaining data above a certain preset and/or determined threshold. In some embodiments, other evaluations of a significant error may be used, for example, if an intermittent loss of data is above a certain preset and/or determined threshold.

If the test of operation 206 is false, in operation 208 it is further checked whether one recording is free of errors. If true, in operation 210 the error-free recording is selected. Otherwise, in operation 212 both recorders are selected such as to represent the practically best recording under the circumstances.

If the test of operation 206 is true, in operation 214 the quality or reliability of the recordings is determined and/or evaluated. In some embodiments, the evaluation of the recordings is based on the quality-metadata of each recording such as described above, whereas, at least optionally, elements or parameters of the quality-metadata are weighted thus reflecting the significance of some errors or parameters relative to others.

In some embodiments, even in case both recordings are error-free yet one recording may be determined of having higher quality than the other one. For example, judging by lengths of recordings, level of jitter in communications, or other parameters such as amount of error corrections or latencies of packets communication, one recording may be determined as 'cleaner' or of higher quality relative to the other.

Subsequently, in operation 216 it is checked whether the evaluation of the recording of Recorder-A is better in quality and/or reliability than the recording of Recorder-B. If true, in operation 218 the recording of Recorder-A is selected, otherwise, in operation 220 the recording of Recorder-B is selected. Yet, the test in operation 216 may be false in the sense that both recordings are of the same quality or of practically the same quality, and, therefore, either recording may be arbitrarily selected.

In some embodiments, a recording having errors may still be evaluated as of better quality relative to an error-free recording. For example, a recording with one or few minor or insignificant errors that practically do not adversely affect the contents and/or the intelligibility thereof but that is otherwise 'clean' may be evaluated as better than an error-free recording that the recordation of which has experienced malfunctions such as lost packets, prolonged jitter or error corrections.

In some cases or embodiments where more than two recorders are employed, the rationale of flowchart 200 and description thereof may be extended or scaled to the additional recorders and recordings thereof. For example, akin to operation 212, more than two recordings may be selected to represent the practically adequate or best recording under the circumstances.

FIG. 3 outlines operations 300 for selection a recording among parallelly recorded recordings, according to exemplary embodiments of the disclosed subject matter.

In operation 302, responsive to a beginning of a telephonic interaction in a local telephony system, recordations of the telephonic interaction are activated in a plurality of recorders operative parallelly and independently, such as instances of recorder 102, to obtain a plurality of recordings of the interaction corresponding to the plurality of recorders.

In operation 304 data related to the quality of recordings associated the recordations are acquired during the recordations of the telephonic interaction.

The data are, for example, the quality-metadata as described above that is collected or acquired with respect to each parallelly recorded recording of the interaction by each recorder or on behalf of each recorder during the course of the recordation thereof.

In operation 306, responsive to an ending of the telephonic interaction in the local telephony system, the recordations of the telephonic interaction are concurrently terminated in the plurality of the recorders, thereby the plurality of recordings of the interaction correspondingly to the plurality of recorders are available or provided, for example, each recording is correspondingly stored in each recorder.

In operation 308, subsequent to terminating the recordations of the telephonic interaction, at least one recording among the plurality of the recordings of the interaction is selected based on the data related to the quality of the recordations. For example, as discussed above and/or with respect to flowchart 200.

It is noted that operations 300 may be applicable and/or operative for a variety of multiple coinciding interactions in various progress stages thereof, and that system 100 and/or components thereof is constructed and/or configured to cope with such a variety of multiple coinciding interactions.

There is thus provided according to the present disclosure a method for selecting a recording among parallelly recorded recordings comprising that in response to a beginning of a telephonic interaction in a local telephony system concurrently activating recordations of the telephonic interaction in a plurality of recorders operative parallelly and independently to obtain a plurality of recordings of the interaction corresponding to the plurality of recorders, and further in response to an ending of the telephonic interaction in the local telephony system concurrently terminating the recordations of the telephonic interaction in the plurality of the recorders, thereby providing the plurality of recordings of the interaction corresponding to the plurality of recorders, and subsequently selecting at least one recording among the plurality of the recordings of the interaction based on acquired data related to the quality of recordings associated the recordations.

In some embodiments, selecting at least one recording among the plurality of the recordings comprises selecting the recording determined to have the best quality in case at least one recording among the plurality of the recordings is determined to be of sufficient quality.

In some embodiments, selecting at least one recording among the plurality of the recordings comprises selecting a plurality of recording in case no recording among the plurality of the recordings is determined to be of sufficient quality.

In some embodiments, the data related to the quality of recordings associated the recordations are acquired for each recording of the plurality of the recordings by each recorder corresponding thereto during the recordations of the telephonic interaction.

In some embodiments, the data related to the quality of recordings associated the recordations comprises elements reflecting adverse occurrences in communicating streaming media of the telephonic interaction to the plurality of recorders during the recordations.

In some embodiments, the telephonic interaction comprises a variety of multiple coinciding interactions in various progress stages thereof.

There is thus further provided according to the present disclosure an apparatus for recording a telephonic interaction, comprising a plurality of recorders operative parallelly and independently therebetween, a local telephony system configured to communicate streaming media of the telephonic interaction to the plurality of recorders, and a controlling device configured for controlling in accordance with the local telephony system operations of the plurality of recorders to correspondingly provide a plurality of recordings of the telephonic interaction.

In some embodiments, each recorder of the plurality of recorders is configured for acquiring data related to the quality of the recordings.

In some embodiments, the data related to the quality of the recordings comprises elements reflecting adverse occurrences in communicating the streaming media of the telephonic interaction to the plurality of recorders.

In some embodiments, the controlling device is further configured to select at least one recording among the plurality of recordings of the telephonic interaction based on the data related to the quality of the recordings.

In some embodiments, controlling in accordance with the local telephony system the operations of the plurality of recorders comprises controlling responsive to indications from the local telephony system about the telephonic interaction.

In some embodiments, the telephonic interaction comprises a variety of multiple coinciding interactions in various progress stages thereof.

In some embodiments, the apparatus further comprises a storage for preserving selected recordings.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for selecting a recording among parallelly recorded recordings, comprising:
    responsive to a beginning of a telephonic interaction in a local telephony system, concurrently activating recordations of the telephonic interaction in a plurality of recorders operative parallelly and independently to obtain a plurality of recordings of the interaction corresponding to the plurality of recorders;
    responsive to an ending of the telephonic interaction in the local telephony system, concurrently terminating the recordations of the telephonic interaction in the plurality of the recorders, thereby providing the plurality of recordings of the interaction corresponding to the plurality of recorders; and
    selecting at least one recording among the plurality of the recordings of the interaction based on acquired data related to the quality of recordings associated the recordations.

2. The method according to claim 1, wherein selecting at least one recording among the plurality of the recordings comprises selecting the recording determined to have the best quality in case at least one recording among the plurality of the recordings is determined to be of sufficient quality.

3. The method according to claim 1, wherein selecting at least one recording among the plurality of the recordings comprises selecting a plurality of recording in case no recording among the plurality of the recordings is determined to be of sufficient quality.

4. The method according to claim 1, wherein the data related to the quality of recordings associated the recordations are acquired for each recording of the plurality of the recordings by each recorder corresponding thereto during the recordations of the telephonic interaction.

5. The method according to claim 1, wherein the data related to the quality of recordings associated the recordations comprises elements reflecting adverse occurrences in communicating streaming media of the telephonic interaction to the plurality of recorders during the recordations.

6. The method according to claim 1, wherein the telephonic interaction comprises a variety of multiple coinciding interactions in various progress stages thereof.

7. An apparatus for recording a telephonic interaction, comprising:
    a plurality of recorders operative parallelly and independently therebetween, in which each recorder is configured for acquiring data related to the quality of the recordings of said each recorder by elements reflecting adverse occurrences in communications of the plurality of recorders with streaming media of the telephonic interaction;

a local telephony system configured to communicate streaming media of the telephonic interaction to the plurality of recorders; and a controlling device configured for controlling in accordance with the local telephony system operations of the plurality of recorders to correspondingly provide a plurality of recordings of the telephonic interaction.

8. The apparatus according to claim 7, wherein the controlling device is further configured to select at least one recording among the plurality of recordings of the telephonic interaction based on the data related to the quality of the recordings.

9. The apparatus according to claim 7, wherein controlling in accordance with the local telephony system the operations of the plurality of recorders comprises controlling responsive to indications from the local telephony system about the telephonic interaction.

10. The apparatus according to claim 7, wherein the telephonic interaction comprises a variety of multiple coinciding interactions in various progress stages thereof.

11. The apparatus according to claim 8, further comprising a storage for preserving selected recordings.

* * * * *